June 15, 1948.　　　A. RAINES ET AL　　　2,443,196
PROCESS FOR MAKING FRONT-SURFACE MIRRORS
Filed June 16, 1944　　　　　　　　　　　3 Sheets-Sheet 1
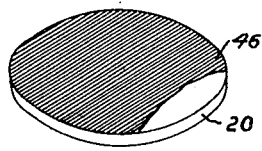
Fig-1-
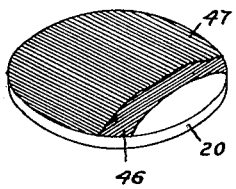
Fig-3-
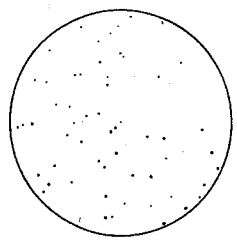
Fig-2-
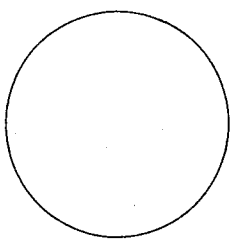
Fig-4-
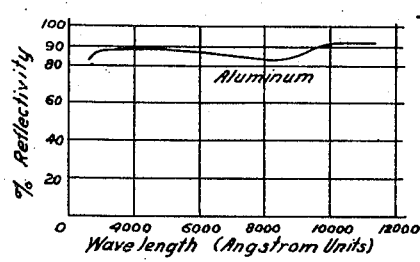
Fig-5-
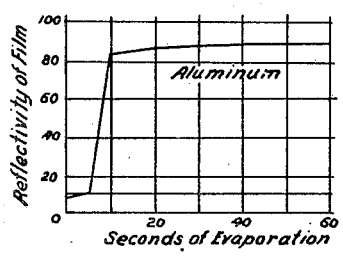
Fig-6-
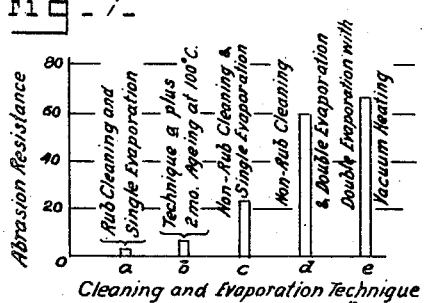
Fig-7-
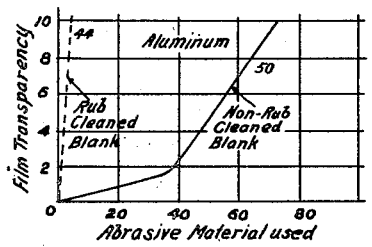
Fig-8-
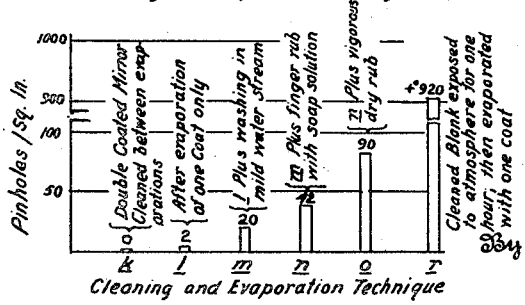
Fig-9-
Inventors
Arnold Raines
Raymond W. Boydston
Allen J. Eshner

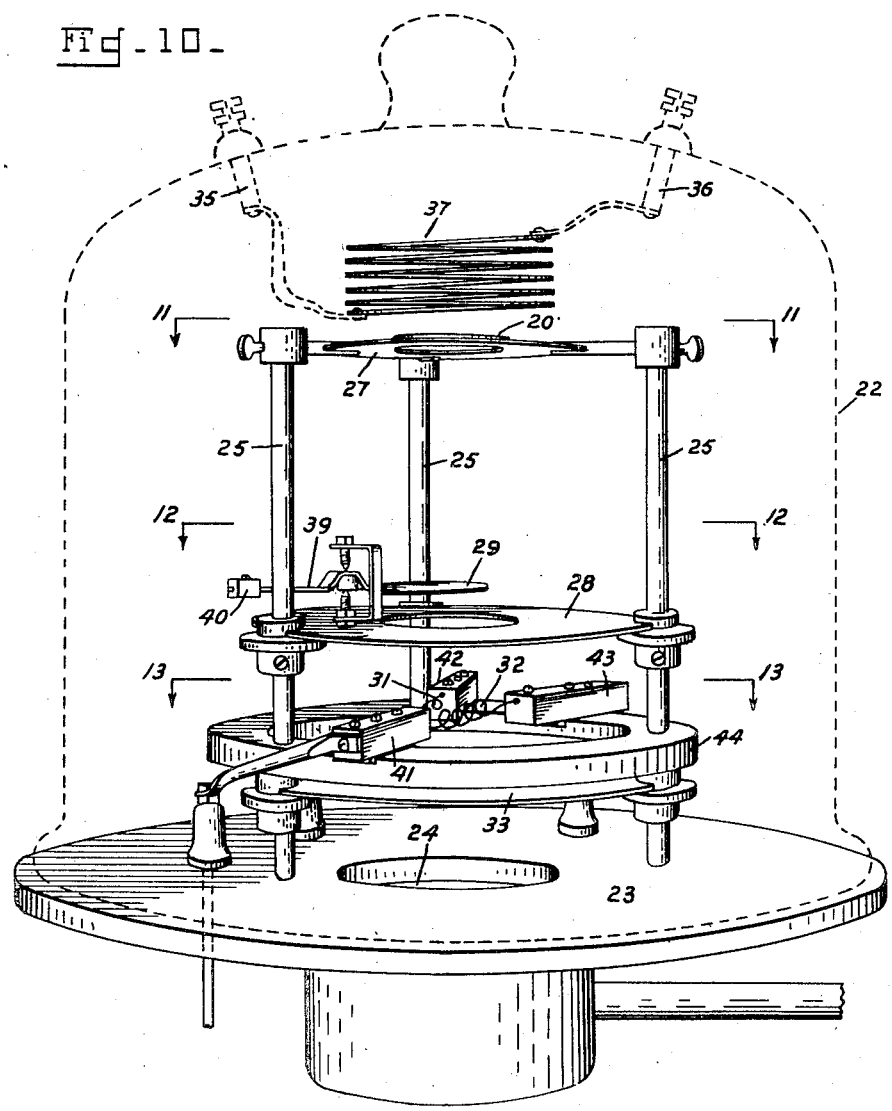

June 15, 1948.  A. RAINES ET AL  2,443,196
PROCESS FOR MAKING FRONT-SURFACE MIRRORS
Filed June 16, 1944  3 Sheets-Sheet 3
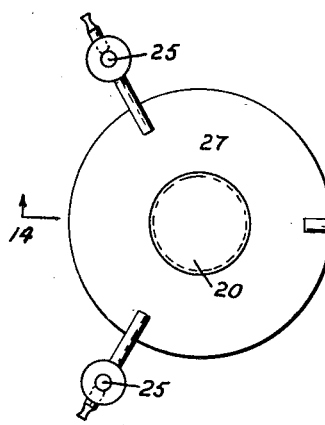
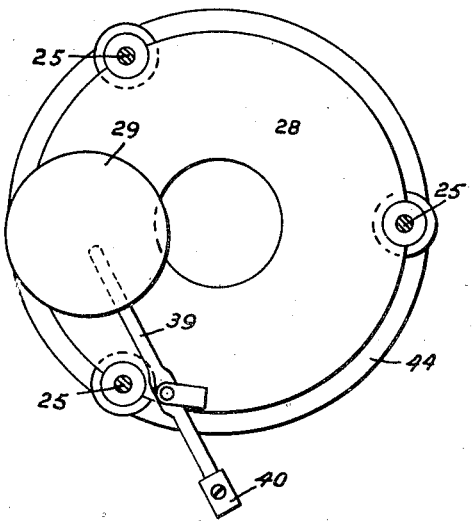
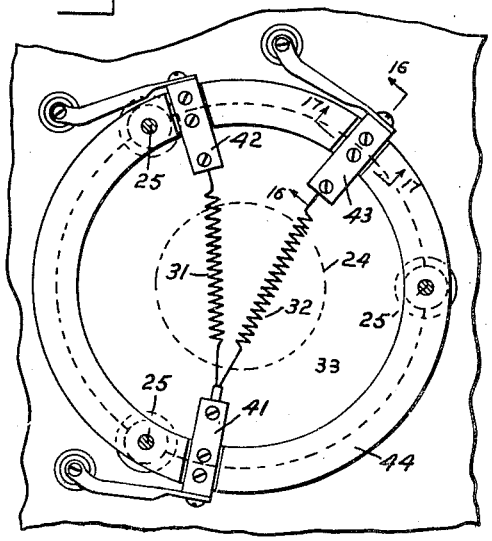
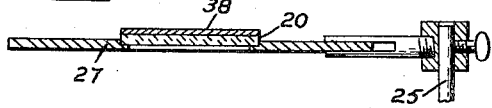
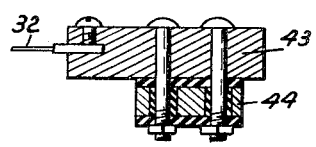
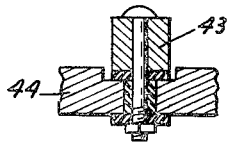
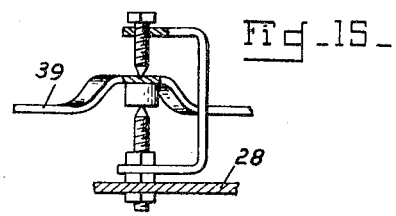
Inventors
Arnold Raines
Raymond W. Boydston
Allen J. Eshner
By C. E. Herrstrom & H. E. Thibodeau
Attorneys Patented June 15, 1948

2,443,196

UNITED STATES PATENT OFFICE 2,443,196

PROCESS FOR MAKING FRONT-SURFACE MIRRORS

Arnold Raines and Raymond W. Boydston, Philadelphia, and Allen J. Eshner, Elkins Park, Pa.

Application June 16, 1944, Serial No. 540,664

1 Claim. (Cl. 117—35)

(Granted under the act of March 3, 1883, as amended April 30, 1928; 370 O. G. 757)

The invention described herein may be manufactured and used by or for the Government for governmental purposes without the payment to us of any royalty thereon.

Our invention relates to mirrors having on the "first" or front surfaces thereof light reflecting films of aluminum or other suitable metal and it has special reference to methods and techniques for making such front surface mirrors and for extending the usefulness thereof.

Broadly stated, the object of our invention is to improve the quality and facilitate the manufacture of front surface mirrors which are suitable for optical instrument and other uses where the requirements to be met are exacting.

A more specific object is to provide films of reflecting metal which do not tarnish, which adhere well and which are hard.

Another object is to provide such films which have no blisters and which are free from pinholes.

A further object is to increase the resistance of front surface mirrors both to corrosion and to abrasion.

In practicing our invention we attain the foregoing and other objects by providing new and improved techniques for preparing the mirror components, for depositing the metal upon the mirror blank, and for treating the reflecting film so formed in a way which enhances the mirror's useful qualities.

Our invention itself, together with additional objects and advantages, will best be understood by the following description of specific embodiments when taken in conjunction with the accompanying drawings wherein:

Figs. 1 and 2 represent a circular mirror and the pinhole characteristics thereof at an intermediate stage of our improved processing;

Figs. 3 and 4 show the same mirror and its complete absence of pinholes after a second coating of metal has been applied to the front surface thereof;

Fig. 5 indicates the properties of aluminum as a reflector of light of the various wave lengths within the visible spectrum;

Fig. 6 shows how the reflectivity of a deposited aluminum film builds up with increases in evaporation time;

Fig. 7 depicts the manner in which abrasion resistance is affected by various techniques of cleaning and evaporation;

Fig. 8 indicates how the film is worn away by abrasive testing material angularly directed thereagainst;

Fig. 9 shows how the number of pinholes per unit area is affected by changes in cleaning and evaporation technique;

Fig. 10 represents vacuum chamber equipment useful in practicing our mirror making process;

Fig. 11 is a section on line 11—11 showing the mirror holding jig of Fig. 10;

Fig. 12 is a showing from line 12—12 of the movable shield and stationary plate beneath the jig;

Fig. 13 is a section on line 13—13 of Fig. 10 showing the chamber's filaments and supporting parts;

Fig. 14 indicates how a metal disk may be placed on top of the glass mirror blank to receive inductive heating for transfer to the blank;

Fig. 15 shows details of the shield arm's pivot mounting; and

Figs. 16 and 17 indicate how the filament's binding posts are insulated from their metal carrying ring.

THE MIRROR COMPONENTS

The mirror blank to be coated may have any one of a number of different shapes. Of these, the flat circular shape shown for disk 20 of Figs. 1, 3, 10 and 14 is illustrative. Blanks of square, rectangular or other outlines also may be used. Size of blank likewise is not critical but may vary within a wide range.

The contour of the blank's surface also is not limited. An absolutely flat surface is shown for the circular disk 20. However, blanks with convex, concave or other optical surfaces also lend themselves to coating by the improved technique of our invention.

A wide choice of blank materials also exists. Possibilities include glass, metal, or other substance which is capable of having the desired optical shape imparted thereto. Glass of many different compositions thus may be used for the mirror blank 20.

Of these, glasses not soluble in acid are ordinarily preferred since they lend themselves to cleaning by an "acid" step technique later described herein. In the description which follows it will be assumed that the illustrative blank 20 is of such material.

Other glasses, such as barium crown, which are soluble in acid also may be used when the cleaning technique is modified to eliminate the acid steps. Similar considerations apply to metal blanks; these, too, are useable when the cleaning treatment is modified to suit their characteristics.

Of the several metals which might be used to coat front surface mirrors, aluminum is found to combine the greatest number of desirable features. It has a relatively high reflectivity (approximately 89% for white light); as the graph of Fig. 5 indicates it reflects all the wave lengths of ligth in the entire color spectrum to substantially the same degree; and it has such high freedom from tarnishing that surfaces thereof remain bright and effectively reflective over long periods of time.

Our improved mirror making technique thus especially concerns itself with the production of front surface mirrors which are coated with aluminum films; features of this new technique are, however, also of utility in the deposit of mirror coatings of other metals.

For best results the aluminum used should have a high purity. One grade prepared for electrolytic condensers and having a purity of 99.9% is found to give excellent results. The most pure grade of aluminum obtainable thus is recommended.

EVAPORATION PROCESS

We effect coating of aluminum or other metal on the mirror blank 20 by a process known as "thermal evaporation." It is carried out in a vacuum chamber which holds both the surface to be coated and a source of metal vapor. This metal is heated until its vapor pressure rises to about $10^{-2}$ millimeters of mercury or greater, whereupon molecular rays are emitted in all directions. The degree of vacuum is such that the mean free path of the molecules exceeds the chamber's dimensions, whereupon molecular rays propagate from the metal and impinge upon the chamber's walls and objects within them.

The mirror blank 20 to be coated is exposed to these molecular rays within the chamber and they accordingly condense on the blank's surface to form the desired film. Such a film exhibits the same degree of polish as the underlying glass (or other mirror blank material) and so requires no subsequent burnishing.

VACUUM CHAMBER APPARATUS

Apparatus suitable for evaporating aluminum or other metal upon mirror blanks is shown by Figs. 10 to 17. Constituting the vacuum chamber is a bell jar 22 and a base plate 23 upon which the jar rests, forming an airtight seal. Suitable vacuum pumps (not shown) communicate with an exhaust opening 24 in the base plate and are effective to evacuate the chamber to a pressure of $10^{-4}$ millimeters of mercury or better.

Supported beneath the removable bell jar 22 by uprights 25 from the base plate are a holding jig 27 for the mirror blank; stationary and movable shield plates 28 and 29; a pair of coiled filaments 31 and 32; and an unbroken shield plate 33 therebeneath.

The represented holding jig 27 supports the mirror blank 20 by engagement of its periphery (see Fig. 14) and exposes substantially the entire underside thereof for reception of coating metal from the filaments below. Provision for accommodating more than one blank or for holding blanks of other sizes and shapes may readily be incorporated into this jig.

The shield plates 28—29 are interposed between the mirror blank 20 and the filaments 31—32. The movable shield 29 is sufficiently larger than the central opening in the stationary plate 28 that a positioning thereover completely prevents metal evaporated from filaments 31—32 from reaching the blank 20 thereabove. However, when swung to the side, as shown in Figs. 10 and 12, shield 29 frees the path and permits evaporated metal to reach the blank's under surface.

Provision for swinging shield 29 from the central to the side position includes a mounting arm 39 pivoted as shown in Fig. 15 and carrying at its outer end a magnetic block 40. Proper manipulation of a strong magnet (permanent or electro) on the outside of the bell jar permits the shield 29 to be shifted from one position to the other without in any way disturbing the chamber's evacuation.

The two coiled filaments 31—32 are for the purpose of suspending and imparting evaporating heat to the aluminum or other plating metal used. Filament 31 is supported between terminals 41 and 42, while filament 32 receives support from terminals 41 and 43. All of these terminals are insulated (see Figs. 16–17) from a metal carrying ring 44 and each is joined with a lead (see Fig. 13) through which energizing current from an external source (not shown) may be supplied.

These filaments preferably are of tungsten or other metal which has a limited solubility (of the order of 3%) in molten aluminum. Aluminum suspended therefrom preferably takes the form of short "stirrup" strips (not shown) bent over the coiled filament wire. This wire is made large enough to prevent burn out due to solubility by the aluminum upon passage of electrical heating current therethrough.

Thus hung in small pieces on the filaments, the aluminum melts upon attainment of proper temperature thereby and flows into molten drops which are retained in the lower lobes of the filament coils by the forces of surface tension. Since aluminum melts at 660° C., a proper operating temperature for the filaments thus is somewhat above this figure. Satisfactory results are attained when the intensity of heating produces a visible or incandescent red glow.

Only one of the filaments 31—32 is heated during evaporation of aluminum upon the mirror blank. Purpose of the second is to act as a "stand-by" and thus be available for immediate use should the first filament accidentally burn out at an intermediate stage in the evaporation process.

The illustrative bell jar 22 shown by Fig. 10 also is equipped with a helix or coil 37 of conducting material strip. The two ends of this helix are secured to terminals 35 and 36 for mechanical support and for reception of electrical energizing current from the outside. With the bell jar in place on its base plate 23, this helix 37 has a position just above that of the mirror blank 20 as supported by jig 27.

Purpose of this helix 37 is to make possible a heating of the mirror blank while within the vacuum chamber. When connected with a suitable source of high frequency alternating current it sets up within the bell jar oscillating electric and magnetic fields which are effective for inducing eddy current and hysteresis loss heating in metal objects placed within its field, or dielectric heating in non-metallic objects, such as the mirror blank itself.

Thus when an iron disk of the type shown at 38 in Fig. 14 is placed on top of the blank 20, high frequency energization of the coil 37 (as by an oscillator of 200 watt capacity and 300 kilocycle frequency) is effective to raise the temperature of the disk and of the mirror blank therebeneath to as high as several hundred degrees centigrade.

CLEANING OF MIRROR BLANK

Investigations by us reveal that aluminum deposited on a glass or other base material surface which is not meticulously clean will have adhesion and other properties vastly inferior to those exhibited by a coating on a thoroughly cleaned surface. In most cases the mirror will look good at first but will develop countless tiny blisters and other defects after a day or so.

Our improved mirror making technique accordingly places strong emphasis upon cleaning of the blank prior to deposit of the aluminum coating thereon. We find that this cleaning must not only be thorough and meticulous but it also must be completed immediately before the blank is introduced into the evaporating chamber. Storage of precleaned mirrors thus is not practical.

Our investigations further reveal that several cleaning procedures can be made to yield satisfactory results. Choice thereamong is dictated to some extent by what material is being used as the mirror blank 20. For those grades of glass which are not soluble in acid (all flints and most crowns with exception of barium) an "acid step" treatment presently to be described is preferred since it is sufficiently effective to make unnecessary supplemental heating of the blank after introduction into the vacuum chamber.

For barium crown glass and other blank materials which are affected by acids, a modified cleaning technique may be used. Illustrative treatments of this latter type are described hereafter. Some of these require as a final step that the blank be heated in the vacuum chamber; others are found to give satisfactory results without such vacuum heating.

ACID STEP CLEANING PROCEDURE

This treatment is found to be especially satisfactory for mirror blanks of glass which are not undesirably soluble in acid. It comprises the following steps: (1) initial scrubbing; (2) contaminant removal; (3) water removal; (4) degreasing; (5) organic material break up; and (6) final drying.

Object of initial scrubbing step is to free the glass blank of all grinding rouge and other granular material adhering thereto when received in the processing room. Cleaning ingredients here used are a powder of calcium carbonate (precipitated chalk) and a soap-like solution of a surface activating (surface tension reducing) agent, such as aerosol, orvus, etc., and distilled water in the respective proportions of about 1 and 10. The calcium carbonate powder is placed on the surface to be cleaned and a wad of absorbent cotton wet with the aerosol solution is used for vigorous rubbing and scouring. This action is very thorough and should be continued until all rouge and other dirt particles have been dislodged.

Such dirt together with all cleaning paste is then rinsed from the blank with tap water. The blank is now subjected to further rubbing by a cotton wad wet with the aerosol or other surface activating solution but without use of the calcium carbonate. It is then rerinsed in tap water and further washed off with distilled water. Aerosol solution so used acts as a cleansing soap but leaves no residual film on the surface being cleaned.

Removal of contaminant from the glass blank now follows. This is effected by a saturated solution of potassium hydroxide. The aerosol-cleaned blank is submerged in this solution and there kept long enough to effect lossening of all previously unremoved dirt. About three minutes are ordinarily sufficient. The blank is now rerinsed with tap water and given a further washoff with distilled water.

Removal of water from the glass surface constitutes the third step. This is done by a solution of acetone, preferably "purest quality," in which the blank is submerged long enough to permit of complete displacement of water therefrom by the acetone. About three minutes are again sufficient. This prepares the blank for the next or "degreasing" step.

Here use is made of stabilized trichloroethylene into which the thus prepared blank is placed and kept long enough for all grease to be dissolved from the glass surface. About six minutes ordinarily are adequate, and no agitation is necessary. The blank is now washed in tap water and rinsed in distilled water preferably directed thereagainst as a jet from a wash bottle.

Break up of organic material is the next cleaning step. This is done by nitric acid (preferably concentrated) into which the glass blank is placed and kept until all carbon containing material is dissolved away. About six minutes ordinarily suffice. Upon removal, all acid is washed from the blank by applications of distilled water.

Final drying of the glass blank concludes the cleaning treatment. This is done without rubbing and in a way which accomplishes a final degreasing and leaves no film or residue of any kind. This may be done in one of two ways.

The first utilizes isopropanol, preferably of highest purity, boiled to produce hot rising vapors. In these vapors the blank is held, as by forceps, until its temperature closely approaches that of the vapor. From one to four minutes are sufficient, depending on the thickness of the blank. Condensation of vapor thereon is rapid at first but gradually decreases with rise in the glass temperature. Upon stoppage of condensation the blank is slowly removed with its surface thoroughly clean and dry.

The second or alternative final drying procedure is done on a spinner, such as a high speed electric motor carrying a chuck into which the blank may be secured. By such a device the blank is spun at several thousand revolutions per minute for a total time of about three minutes; during the first minute hot distilled water from a wash bottle is forced hard against the spinning surface, and by centrifugal action such water is removed bodily without leaving any film or residue. Such removal is completed during the final two minutes, at the end of which time the blank is ready for introduction into the evaporating chamber.

An essential caution to be observed during all of the foregoing cleaning steps except the first or "initial" scrubbing, is to keep the blank completely free from contact with the fingers or other objects by which grease or other dirt might be imparted thereto. We find that metal forceps engageable with the blank's edges may satisfactorily be used to effect all handlings incident to the foregoing and to preserve the progressively increasing degree of cleanliness which the treating steps impart to the blank.

One test of an acceptable degree of cleanliness by the final surface is that "breath figures" shall not appear thereon. Absence of such figures indicates that breath moisture condensing on the surface forms into a thin continuous film and not into individual droplets, as tends to be the case when dirt of any kind is present on the blank.

PLACEMENT IN VACUUM CHAMBER

Prior to or concurrent with the just described cleaning of the mirror blank, the following preparations of the vacuum chamber are made. The bell jar 22 is lifted from its base and the filaments 31—32 are cleaned and dried; strips of the aluminum to be evaporated are cleaned (as by soaking in nitric acid and washing in distilled water), dried with lens tissue and hung as stirrups in the filament coils; and the shield 29 is swung to the central position where it completely covers the opening in stationary plate 26. All handling of the aluminum strips is by the aid of tweezers and without touching or other contact by which contaminations might be transmitted.

The freshly cleaned glass blank 20 is now placed, again by the aid of tweezers or tongs, in holding jig 27, as shown in Fig. 10, with the surface to be coated on the under side. The bell jar 22 is next lowered over the mirror and upon base plate 23 where an airtight connection is effected in any suitable manner such as by a rubber gasket (not shown) or by the aid of a sealing compound smeared around the jar's edge and melted against the base plate by a gas flame.

EVACUATION OF THE CHAMBER

The vacuum system is now placed in operation. In one arrangement used by us two mechanical "fore" pumps (a "slow" and a "fast" not shown) first act successively to bring the pressure down to an intermediate value and then are supplemented by an oil "diffusion" pump which, after several minutes, further lowers the chamber pressure to about $10^{-4}$ millimeters of mercury. Continued operation of the "fast" fore pump along with the diffusion pump maintains the bell jar pressure at or below the low level named.

Among the advantages accruing from the stated use of a slow "fore" pump is that it prevents formation of a "Wilson cloud" within the chamber during the evacuation. Such prevention is especially necessary during the summer months and on high humidity days.

HEAT CLEANING OF FILAMENTS

With the shield 29 still centered beneath the mirror blank the two coiled filaments 31—32 are precleaned by successive passage therethrough of heating current sufficient to produce a red glow. In each instance this current is continued until the suspended strips of aluminum foil melt into large drops which adhere themselves by surface tension to the lower lobes of the filament coil.

By such procedure dirt or other foreign material on the filament or on the suspended aluminum is evaporated therefrom and thus prevented from later being deposited on the mirror blank's surface. As earlier stated, use of high purity aluminum assures that film deposit on the blank will be of reflecting metal which is substantially free from impurities.

FIRST EVAPORATION OF ALUMINUM

With the vacuum chamber thus conditioned, the shield 29 is now swung to the side thereby exposing the mirror blank 20 to the filaments 31—32 therebeneath. As earlier stated this is done by the aid of a magnet (not shown) so passed along the outside of the bell jar wall that a following motion by arm 39's magnetic block 40 transfers the shield from the center to the side (see Figs. 10 and 12).

One of the two filaments is again heated to a bright red glow. Under this condition it evaporates aluminum in all directions and thus builds up a deposit on the under side of the mirror blank. An observer looking downwardly through the top of the bell jar at first sees the brightly glowing filament clearly through the blank; however, with continuance of the evaporating process the filament appears less and less bright as the aluminum coating becomes thicker and more and more opaque.

As the evaporation continues the reflectivity of the deposited film builds up in the manner illustrated by Fig. 6. This curve indicates that during the first few seconds the emission of the aluminum is relatively slow; that deposit of aluminum on the blank's surface then increases rapidly, providing a film of well over 80% reflectivity at the end of ten seconds; and that although the coating continues to thicken from that point on, the reflectivity rises but little more, it reaching a maximum of 89% (for white light) after about 40 seconds.

At this 40-second point the opaqueness of the coating has become such that visibility of the glowing filaments through the mirror blank is greatly reduced; at the end of about two minutes the image of the filament is ordinarily completely obscured. The preferred thickness of film is that which gives maximum reflectivity.

In making this first coating the filament temperature is controlled so that satisfactory evaporation takes place in from 15 to 60 seconds.

Should the originally used filament accidentally burn out at an intermediate stage in the coating process the second or "stand by" filament may be brought into action and the evaporation thereby continued under the originally produced conditions of chamber vacuum.

FIRST REMOVAL FROM CHAMBER

When the desired thickness of coating has been achieved the filament current is turned off; the vacuum pumps are shut down; and air is allowed to re-enter the chamber. The bell jar 22 is now lifted from the chamber's base thereby permitting the coated mirror blank 20 to be lifted from its holding jig.

As now removed from the vacuum chamber the mirror blank has a front surface coating of the character shown at 46 in Fig. 1. This plating is bright, uniform, without blisters and almost completely free from pinholes; it exhibits the high reflectivities indicated by Figs. 5 and 6; and in quality it compares favorably with the best aluminum front surface mirrors known to the prior art.

Its abrasion resistance has, however, only the intermediate value which Fig. 7 indicates at c; and typically it will have the relatively few pinholes which Fig. 9 indicates at l. Washing in a mild stream of water soon increases these pinholes to the value shown at m in Fig. 9; rubbing the metal coat with the fingers wet with soap solution further increases the pinholes to the value shown at $n$; and vigorous dry rubbing further brings the total pinholes to the elevated value indicated at $o$.

Typifying the latter condition is the actual photograph of Fig. 2 showing points of light which pass from an intense source of illumination through the mirror's glass and reflecting film to a photographic plate or paper in contact therewith on the opposite side.

PREPARATION FOR SECOND EVAPORATION

We have discovered that the toughness, immunity to pinhole development and corrosion resistance of the single coated mirror of Fig. 1 can vastly be improved by further giving the mirror (as taken from the vacuum chamber) a metal removal and cleaning treatment and then evaporating a second coating of aluminum upon the cleaned surface of the original metal plus all exposed areas of the underlying glass.

Several different techniques of treatment may be used at this point. Objective is to break through all weak places in the aluminum surface and produce all the pinholes possible; also to clean all contaminant particles from the glass along with all of the dirt or other foreign material carried to that spot by such particles.

One preferred treatment for accomplishing this includes the steps of: (1) gentle surface rubbing; (2) water removal; and (3) final drying.

Purpose of the gentle surface rub is to remove all portions of the metal film which are not firmly adhered to the glass surface. This may be done by use of a wad of cotton kept saturated with a solution of aerosol diluted in distilled water (in proportions of about 1 to 10). With this saturated wad the aluminum film surface is swabbed and rubbed with light pressure while a small stream of water gently falls thereon.

This action is continued until all unadhered portions of the film have been loosened and washed away. Numerous pinholes are ordinarily thus produced, each being identified with a portion of the film which did not adhere in the original coating. A rinse with distilled water completes this step.

The thus treated blank now has all water removed from its metal film by placement in acetone for about 3 minutes. The action here is the same as that which takes place in a corresponding step in the blank's initial cleaning treatment earlier described.

Final drying in the hot vapor of boiling isopropanol or the like now follows. This drying may duplicate that earlier described as the final step of the blank's initial cleaning treatment. Exposure to the isopropanol vapor for from 1 to 4 minutes leaves the metal film's surface thoroughly clean and dry.

Optionally, the final drying step may consist of placing the mirror blank in a centrifugal spinner, blasting its metal surface with hot distilled water from a wash bottle while spinning, and leaving it there to be spun dry.

SECOND COATING OF ALUMINUM FILM

To the mirror surface thus rubbed, washed and dried there is now applied a second coating of aluminum film indicated at 47 in Fig. 3. It fills all pinholes and other breaks in the original coating 46 and results in a composite mirror film having superior qualities of continuity, toughness, hardness and durability.

Application of this second aluminum coating may be by the same procedure as was followed in evaporating the first coating. The blank 20 is again placed in the vacuum chamber with its plated surface 46 down, and the chamber is evacuated as before. With the shield 29 beneath the mirror the filaments are heat cleaned and the shield is swung to one side. One of the filaments is heated to proper evaporating temperature, and a second coating of aluminum is applied to the mirror blank.

The process here used is identcal to that earlier described for the first coating. Its effect is to fill all breaks in the first coating and to produce a mirror having the superior qualities presently to be described. At the end of this second evaporation the mirror is removed from the evaporating chamber as before.

It now constitutes the finished product and the front surface thereof comprises the composite aluminum coating shown at 46—47 in Fig. 3. This coating will preferably have that total thickness which achieves maximum reflectance consistant with other requirements.

ALTERNATIVE CLEANING PROCEDURES

The cleaning procedures already described are illustrative merely, and although preferred they may be replaced by equivalent techniques differing in detail but still satisfactorily accomplishing the desired purpose.

For mirror blanks of glass or other material which is not affected by acid one such alternative procedure for the "first" cleaning of the blank utilizes the steps of soaking in glacial acetic acid and washing in tap plus distilled water; rubbing thoroughly with a cotton pad saturated with aerosol, water and calcium carbonate paste and again washing in tap plus distilled water; soaking and agitating for 3 minutes in saturated potassium hydroxide and once more washing in tap plus distilled water; soaking and agitating in pure acetone followed by 200 proof grain alcohol and again washing in tap plus distilled water; soaking and agitating for 6 minutes or more in stabilized trichloroethylene and following this by tap plus distilled water wash; soaking and agitating for 6 minutes or more in concentrated nitric acid and once again washing in tap plus distilled water; and finally drying by the "spinner" technique earlier described.

For mirror blanks of barium crown glass, metal and other substances which are affected by acid the following "first" cleaning technique is found to yield satisfactory results. Scrub the blank with a solution of aerosol and iodine in double distilled water mixed and kept boiling all of the time during use; rinse the blank in boiling distilled water followed by a flush therewith from a wash bottle; and finally flush the hot mirror blank from the preceding step with double distilled acetone of adjusted lower temperature.

In carrying out the first step of the foregoing technique, it is essential that boiling of the solution be continuous, and should such boiling stop the solution must be discarded; it cannot be salvaged. Practice of this technique is accompanied by the generation of dangerous fumes, and to carry these away hoods and related apparatus should be used. The foregoing cleaning treatment is, however, absolutely harmless to any kind of glass or metal.

INDUCTIVE HEATING IN VACUUM

Under certain conditions there is an advantage to heating the mirror blank 20 while it is within the vacuum chamber. We find, for example, that such heating serves to intensify the surface cleaning given to the blank before placement in the chamber.

Use may be made of a steel or other metal disk 38 laid on top of the blank 20 shown in Fig. 14. With the blank supported from the chamber's holding jig 27 and the bell jar 22 in place, as shown in Fig. 10, the helix coil 37 is positioned relatively close to this steel disk 38.

Energization of coil 37 by connection through terminals 35—36 with an external source (not shown) of high frequency alternating current causes the resulting magnetic field emanating from the coil to set up in the disk metal electrical eddy currents and hysteresis losses which raise the disk's temperature and cause heat therefrom to be conducted to the glass blank 20 in direct contact therewith. Dielectric heating without the use of the metal disk also is possible.

Satisfactory results with a metal disk have been realized by us when the external source takes the form of an oscillator with output frequency of about 300 kilocycles and power supply capabilities of about 200 watts. By such facilities it is possible to raise the temperature of the glass blank 20 to a value estimated to be of the order of several hundred degrees centigrade.

Continuance of such vacuum chamber heating for several minutes is ordinarily sufficient to effect final cleaning and contamination removal from the blank's surface while within the vacuum chamber. During this final cleaning period the shield 29 preferably is closed to prevent evaporation of aluminum from the coating filaments upon the mirror blank surface until after the heat cleaning benefits have been realized.

Contrast of Fig. 7's d and e tabulations shows that such vacuum heating can be made to give improvement in the abrasion resistance of the final double coated mirror of Fig. 3.

CHARACTERISTICS OF FINISHED MIRROR

Aluminum front surface mirrors made by the improved process of our invention are characterized by numerous superior qualities among which mention will be made of the following:

*Accuracy of mirror surface*

Both the contour and the degree of polish of the blank's original surface are faithfully reproduced by the aluminum coating evaporated thereon as here described. Subsequent burnishing is therefore unnecessary, and tests with "optical flats" confirm that the aluminum film of the finished mirror does in fact accurately duplicate the flatness or other optical contour of the uncoated blank.

Accuracy departures never exceed a small fraction of a wave length of light. Our improved mirrors thus readily meet the exacting requirements of height finders, range finders and other precision instruments by which the aim and firing of artillery and other military weapons is controlled.

*Acceptable reflectivities*

Aluminum films 46—47 evaporated on mirror blanks by our improved process offer reflectivities of the high order shown by the graphs of Figs. 5–6. Reflectometer tests consistently show as high as 89% white light reflectance by front surface mirrors both of the double-coat type of Fig. 3 and of the single-coat type of Fig. 1.

Reflectivities of this elevated order are satisfactory for practically all applications. Aluminum's inherently high resistance to progressive and harmful oxidation and tarnish assures maintenance of these high values over extended periods and under adverse conditions of use.

*Production of sharp straight edges*

Military optics often require the making of mirror surfaces with sharp straight lines to mark the boundary between coated and uncoated areas. Our improved evaporation process lends itself to the ready production of such sharp edges by a simple placement of masks (not shown herein) over those portions of the blank area from which it is desired to exclude the metal film. In this way straight edges meeting high standards of acceptability can be made.

*High adhesion to base material*

Our improved mirrors are characterized by tenacious adherence of the aluminum film 46—47 to the mirror blank 20. One reliable measure of such adherence is the "Scotch tape" test. It consists in carefully placing the sticky surface of clean Scotch tape over the mirror's metal film, rubbing it firmly thereagainst throughout all areas of contact, pressing one side of the tape over the mirror blank's edge, and then slowly ripping the tape from the mirror. Successful passage of the test requires that no part of the reflecting film be removed with the tape.

The mirror surfaces 46—47 resulting from the process of our invention consistently pass this and other tests and thus are far more adherent than aluminum surfaces of the prior art which partially or even wholly are removed by the tape.

*Surface free of blisters*

Evaporated aluminum mirrors of the prior art have considerable tendency to develop tiny blisters after removal from the vacuum chamber. At each of such blisters the metal film separates from the blank and often punctures.

Front surface mirrors made by the improved technique here described are characterized by such firm and uniform adherence of the aluminum film 46—47 that blisters do not develop even after long periods of time and use. Nor can blisters be produced by prolonged exposure, heating, or vigorous rubbing of the film.

*High abrasion resistance and hardness*

Aluminum, like other metals of high reflectivity is comparatively soft, and mirrors of the prior art coated therewith are found to receive hairline scratches when rubbed with lens tissue, dry cloth or the like.

The mirrors of our invention offer improvement in this respect for in them the surface of the aluminum film 46—47 is sufficiently harder than the film metal therebeneath to withstand cleaning without scratching, streaking or producing other unwanted deteriorations. This is borne out by the curve of Fig. 8.

By that curve there is plotted one measure of the ability of the film metal to resist erosive wear by powdered abrasive such as powdered emery or aluminum oxide dropped thereon angularly from a substantial height, such as several feet. The there chosen measure of abrasive wear is the film's transparency or ability to allow passage of light therethrough.

When subjected to this erosive wear test an aluminum coating evaporated on glass previously cleaned by a "rub" technique of the prior art was worn away by only a small quantity of the abrasive and gave the steep curve 49. An aluminum coating 46—47 of the same thickness deposited on glass by the improved technique of our invention required much more abrasive to wear it away and gave the gradually sloping curve 50.

The bend in this curve 50 is indicative of a slower rate of wear by the surface aluminum and hence a greater metal hardness at the surface than underneath. Contrast, moreover, of curve 50 with curve 49 shows that the aluminum front surface mirrors of our invention are characterized by film hardnesses of many times those incident to aluminum mirrors of the prior art.

Further bearing out the foregoing is the test data of Fig. 7. In the captions thereof the term "rub" designates any cleaning technique wherein the final drying step is effected by a rubbing of the blank's surface with a dry cloth, lens tissue or other substance; the term "non-rub" designates our improved cleaning treatment wherein rubbing is completely eliminated from the final drying step as well as from all other steps except that of initial scrubbing. By this Fig. 7 data there are emphasized the very substantial improvements in abrasion resistance which the "non-rub" cleaning and metal depositing techniques of our invention make possible.

Surface free from pinholes

Even though pinholes affect reflectivity but little (ratio of their aggregate area to that of the total reflecting surface is seldom appreciable), elimination thereof from front surface mirrors is highly desirable for other reasons. Corrosion spots, for example, develop at and around pinholes; blisters and other loosenings of the film are incident thereto.

Aluminum front surface mirrors produced as here described do not have pinholes in the finished form of Fig. 3; nor do they develop pinholes upon vigorous rubbing or other abuses. This is confirmed by placing a source of intense illumination on the uncoated side of the mirror and recording on a photographic plate in contact with the coated side the light which passes through the aluminized area.

Mirrors made as here disclosed yield the picture of Fig. 4 showing complete absence of pinholes; aluminized mirrors of the prior art give a picture such as that of Fig. 2, or worse, showing pinholes in substantial number.

Further discoveries made by us relative to the elimination of pinholes are shown by Fig. 9. Technique $l$ thereof yields the single coated mirror of Fig. 1 in which practically no pinholes exist when taken from the evaporating chamber. However, by techniques $m$, $n$ and $o$ thereafter applied the pinholes of Fig. 1's mirror are progressively increased to nearly 50 times their original value.

The importance of allowing only a minimum of time to elapse between completion of the blank's cleaning and start of aluminum evaporation thereon is emphasized by Fig. 9's technique $r$. This data confirms that dust settled on the clean surface so seriously interferes with adherence that a pinhole at every speck may even be produced.

Fig. 9's technique $k$ yields the double coated mirror of Fig. 3 in which there are no pinholes when taken from the vacuum chamber. Unlike the single coated mirror of Fig. 1, this Fig. 3 mirror will not develop any pinholes when a stream of water is directed thereagainst, or when the surface is rubbed with the fingers and soap solution or when the metal film is subjected to dry rubbing.

A complete solution to the problem of pinholes in front surface mirrors thus is believed to have been made available by the improvements of our invention.

High resistance to corrosion

Exposure of front surface and other military mirrors to widely varying temperatures and conditions of atmosphere calls for a reflecting film which is highly resistant to corroding influences.

Measure of such resistance includes a "salt spray" test wherein the mirror surface must not deteriorate under a spray of salt water directed thereagainst for 24 hours at 50° C.; a "temperature" test wherein the mirror must stand up under prolonged temperatures from —50° C. to 100° C.; and a "distilled water" test wherein a drop of distilled water is placed on the mirror's surface, allowed to dry normally and then cleaned therefrom by conventional methods to determine whether the mirror film is removed or deteriorated at the spot.

Mirrors made as herein described are so highly resistant to corrosion as to pass all of the tests just outlined.

SUMMARY

From the foregoing it will be apparent that we have made highly practical improvements in mirrors having on the "first" or front surfaces thereof light reflecting films of aluminum or other suitable metal; that we have raised the quality and facilitated the manufacture of such front surface mirrors; that we have provided films of reflecting metal which do not tarnish, which adhere well and which are hard; that we have eliminated all pinholes and blisters from such films; and that we have increased the resistance of front surface mirrors both to abrasion and to corrosion.

Our improvements are therefore extensive in their adaption and are not to be restricted to the specific form here disclosed by way of illustration.

We claim:

In the art of making optical mirrors, the technique which comprises cleaning the surface of a glass mirror blank by supporting it in a vacuum chamber, locating a removable electrically conductive article on said glass blank, evacuating said chamber, subjecting said glass blank to a high frequency electromagnetic field of such intensity and character as to induce in said blank dielectric and other losses which raise the blank's temperature and thereby impart heating thereto, thermally evaporating and condensing a first coating of aluminum upon said cleaned surface while in said vacuum, breaking said vacuum and gently rubbing and washing said first coating to remove all unadhered portions thereof from the glass blank, reforming the vacuum, and with the glass blank in the vacuum depositing a second coating of aluminum upon the so treated said first coating and upon all exposed areas of the blank therebeneath, whereby to form a reflecting film which is tenaciously adherent and completely continuous and which has no pinholes or breaks of any kind.

ARNOLD RAINES.
RAYMOND W. BOYDSTON.
ALLEN J. ESHNER.

(References on following page)

REFERENCES CITED

The following references are of record in the file of this patent:

UNITED STATES PATENTS

| Number | Name | Date |
|---|---|---|
| Re. 18,908 | Van Derhoef | Aug. 1, 1933 |
| 2,160,981 | O'Brien | June 6, 1939 |
| 2,217,228 | Macksoud | Oct. 8, 1940 |
| 2,239,642 | Burkhardt et al. | Apr. 22, 1941 |
| 2,293,206 | Harris | Aug. 18, 1942 |
| 2,301,456 | Sabine | Nov. 10, 1942 |
| 2,304,182 | Lang | Dec. 8, 1942 |
| 2,322,613 | Alexander | June 22, 1943 |
| 2,333,534 | Lang | Nov. 2, 1943 |
| 2,394,930 | McRae | Feb. 12, 1946 |